April 21, 1936.  F. LINDER  2,038,182

CLUTCH OPERATING MECHANISM

Filed Feb. 27, 1932  2 Sheets-Sheet 1

INVENTOR
Francis Linder
BY
Martin J. Finnegan
ATTORNEY.

April 21, 1936.　　　　F. LINDER　　　　2,038,182
CLUTCH OPERATING MECHANISM
Filed Feb. 27, 1932　　　2 Sheets-Sheet 2
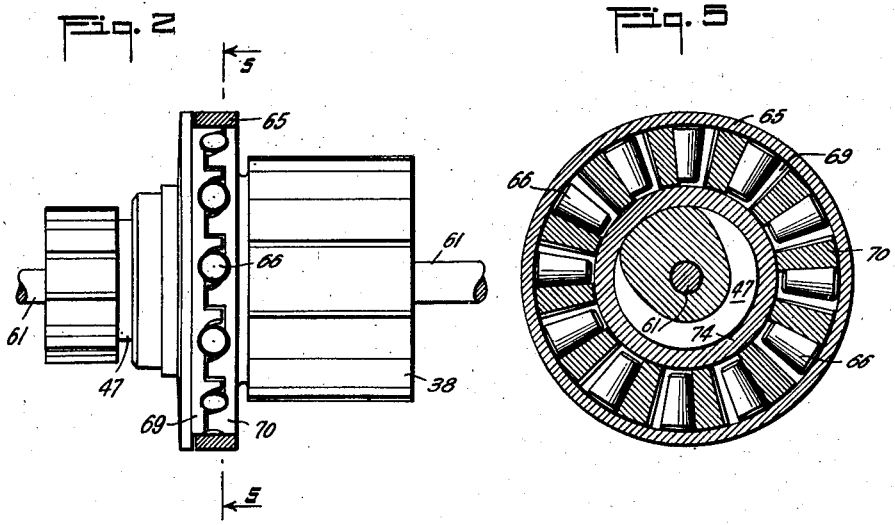
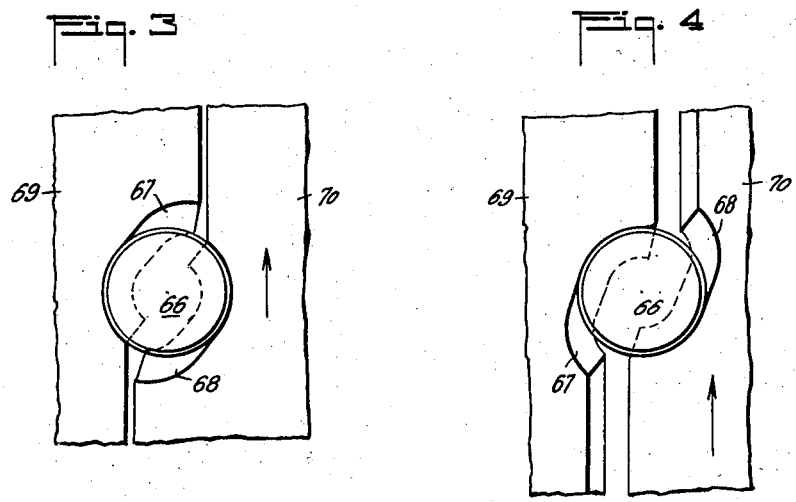
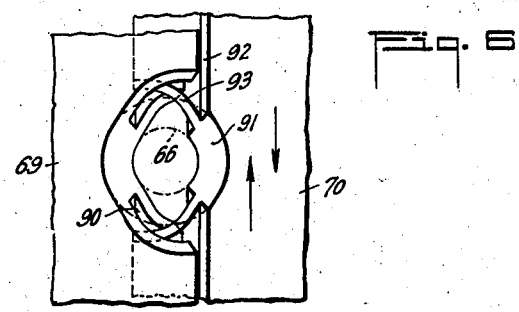
INVENTOR
Francis Linder
BY
Martin J. Finnegan
ATTORNEY Patented Apr. 21, 1936

2,038,182

UNITED STATES PATENT OFFICE 2,038,182

CLUTCH OPERATING MECHANISM

Francis Linder, East Orange, N. J., assignor, by mesne assignments, to Eclipse Aviation Corporation, East Orange, N. J., a corporation of New Jersey Application February 27, 1932, Serial No. 595,642

4 Claims. (Cl. 123—179)

This invention relates to engine starting apparatus and more particularly to apparatus for starting airplane engines, although not necessarily confined to such use.

An object of the invention is to provide novel means for controlling the torque transmitting capacity of a starter of the foregoing character; but in its broader aspects the invention provides novel capacity controlling means for driving mechanisms in general.

A further object of the invention is to provide in a driving mechanism of the type in which the driving torque is transmitted to a member to be driven through a friction clutch, novel means for maintaining the torque capacity of said clutch constant during the entire period of torque transmission, regardless of any change occurring in the coefficient of friction of the driving surfaces of the clutch.

Another object of the invention is to provide a clutch mechanism of the foregoing character wherein any tendency for the torque capacity of the clutch to vary, due to heat responsive expansion of the elements thereof or for any other reason will automatically produce a counter-acting tendency operating to maintain the torque at its normal predetermined value.

Still another object of the invention is to provide in a device of the foregoing character, novel clutch setting means whereby a relatively low pressure, insufficient to interfere with or retard the meshing action exists during the pre-meshing period.

Another object of the invention is to provide clutch controlling means of the nature just described and further characterized by the provision of means for automatically increasing the torque transmitting capacity of the friction clutch in response to the load applied thereto by virtue of the completion of the meshing action. In this connection a feature of the invention is the provision of novel pressure applying means operative automatically in response to the continued rotation of the clutch driving elements immediately following the establishment of a condition of complete mesh.

These and other objects and advantages to be derived from the use of the invention herein disclosed involve the inter-relation and relative function of the parts and will become apparent upon inspection of the following specification, reference being had to the accompanying drawings, wherein the preferred embodiment of the invention is disclosed. It is to be understood however, that the drawings are for the purpose of illustration only and are not designed as a definition of the limits of the invention, reference being had for such purpose to the appended claims.

In the drawings,

Fig. 2 is a view in elevation of certain of the parts involved in the novel clutch controlling action;

Fig. 3 is a schematic representation of the relative position of certain of the parts shown in Fig. 2, as such parts appear prior to application of load thereto;

Fig. 4 is a similar schematic representation of the same parts as they appear after the application of load thereto;

Fig. 5 is a transverse sectional view along the line 5—5 of Fig. 2; and

Fig. 6 is a schematic representation of a modification of the parts shown in Figs. 3 and 4;

Figure 1:
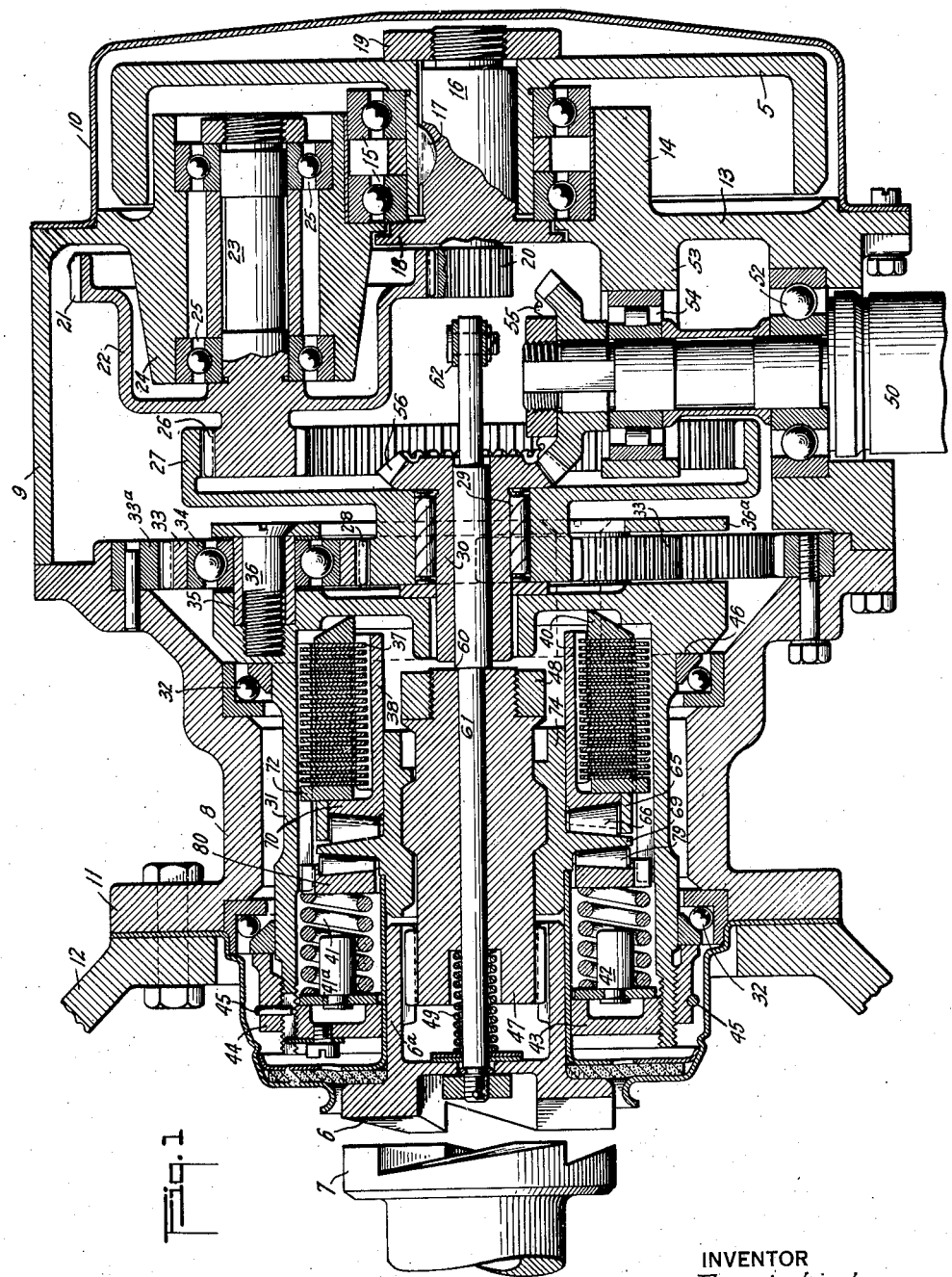
Fig. 1 is a longitudinal sectional view of a device embodying the invention.

Referring to the drawings, the starting mechanism therein shown comprises a flywheel 5 adapted to rotate an engine-engaging member or clutch jaw 6 which is movable into driving engagement with a jaw member 7 provided on an engine crankshaft (not shown) or an extension thereof. The starting apparatus includes a housing constituted by an inner section 8, an intermediate section 9 and a flywheel cover section 10, the sections being removably secured together in any suitable manner and the inner section being provided with a flange 11 to facilitate mounting of the starter on the crankcase, a portion of which is shown at 12.

The intermediate housing section 9 is provided adjacent the outer end thereof with an irregularly shaped wall or diaphragm 13 having a boss 14 formed centrally thereof to receive the flywheel 5. The flywheel is adapted to be rotated at high speed on bearings 15 in order that sufficient energy may be stored therein for cranking the engine, and a gear train is preferably provided for transmitting the energy stored in the flywheel to the engine-engaging member 6, the gear train being so constituted that member 6 will be rotated at a much lower speed than that of the flywheel. For this purpose a shaft 16 extends through the hub of the flywheel and is drivably connected thereto by means of a key 17. The inner end of shaft 16 is provided with a flange 18 which engages bearings 15 and coacts with a nut 19 threaded onto the outer end of the shaft and abutting the flywheel to prevent longitudinal movement of the shaft relative to said flywheel. Shaft 16 is provided closely adjacent flange 18 with a pinion 20 that meshes with a spur gear 21 formed on the large end of a bell shaped member 22 that is rotatably mounted as by means of a stub shaft 23 in an elongated boss 24 formed in the wall 13. Ball bearings 25 are preferably provided for rotatably mounting shaft 23.

Formed integrally with the bell shaped member 22 and shaft 23, or rigidly connected thereto in any suitable manner, is a pinion 26 which meshes with an internal spur gear 27 that is coaxially disposed relative to the flywheel 5. Gear 27 is formed integrally with a pinion 28 that is rotatably mounted by means of a bearing 29 on a stub shaft 30 which is splined to and projects centrally from the closed end of a barrel 31 rotatably mounted in inner housing section 8 by means of ball bearings 32.

Pinion 28 constitutes a sun gear for a plurality of planetary gears 33, one of which is shown in section in Fig. 1. Preferably three planetary gears are employed, the same being spaced at intervals of 120° about the closed end of barrel 31, and said gears mesh with an internal gear 33ª which is rigidly secured in any suitable manner to the inner surface of housing section 8. Each planetary gear is rotatably mounted by means of a ball bearing 34 on a sleeve 35 having the inner end thereof countersunk in the outer face of the closed end of the barrel. A screw 36 extends through the sleeve and is threaded into the end of said barrel. A ring 36ª is carried by the outer ends of the screws 36 and constitutes a retaining member for the ball bearings 34 and sleeves 35.

Means are preferably interposed between the gear train described above and the engine-engaging member 6 for yieldingly transmitting the energy in the flywheel to the engine crankshaft without damage such as might result if the driving connections were entirely constituted by rigidly connected elements. For this purpose a multiple disc clutch is preferably employed, said clutch being mounted in barrel 31.

As shown, the clutch comprises a plurality of annular discs 37, certain of the discs being splined at their outer peripheries to the inner surface of barrel 31, and the remaining discs being splined at their inner peripheries to the outer surface of a sleeve 38 which is provided at one end with a flange 70. The clutch discs are positioned between flange 70 and a pressure ring 40 contacting with the closed end of barrel 31; adjustable yielding means being provided for holding sleeve 38 in operative position with respect to the discs and barrel and for varying the frictional engagement of said discs.

In the illustrated embodiment the yielding means comprises a plurality of coil springs 41 which extend longitudinally within the barrel; the outer ends of said springs having operative association with the flange 70 through the novel torque responsive means to be described. An annular plate 41ª provided with a plurality of laterally projecting studs 42, is mounted in the barrel with the studs extending into the coils of the springs whereby the latter are maintained in proper spaced relation. An adjusting nut 43 is threaded into the open end of the barrel and has abutting engagement with the inner face of plate 41ª. By adjusting the position of nut 43 longitudinally of barrel 31 the compression of springs 41 may be changed to vary the pressure with which the clutch discs or plates 37 are engaged.

Exteriorly threaded onto the inner end of barrel 31 is a ring 44 for retaining the adjacent ball bearing 32. Ring 44 may be locked in position by means of a wire 45, and said ring is adapted (in conjunction with a shoulder 46, provided on the outer end of the barrel and having engagement with the inner race of outer ball bearing 32) to prevent endwise movement of the barrel relative to the inner housing section 8.

Positioned within sleeve 38 is a threaded shaft 47 adapted for rotary and longitudinal movement relative to said sleeve. The outer end of said shaft is provided with suitable means such as a nut 48 adapted to engage a shoulder formed interiorly of member 47 (to be further described) to limit longitudinal movement of the shaft to the left as viewed in Fig. 1. The inner end of shaft 47 is longitudinally splined and extends into the correspondingly splined hub portion 6ª of clutch member 6 whereby these parts have positive driving engagement, but are adapted for relative longitudinal movement. A coil spring 49 which preferably has its outer end extending into a recess in shaft 47 is interposed between said shaft and the jaw member 6, and yieldingly resists movement of the jaw member toward the shaft. Such movement may be effected at the proper time due to the engagement of the shoulder 60 of rod 61 with the end of shaft 47, the rod 61 being operable through a suitable lever 62 extending out through the casing section 9. Means (manually or power operable) are provided for rotating the flywheel 5 to store energy therein. As shown, said means includes a cranking shaft 50 which is rotatably mounted in housing section 9 with the outer end thereof projecting exteriorly of said housing to receive a handcrank or power member (not shown). Shaft 50 is rotatably supported in the side wall of section 9 by means of a ball bearing 52 and the inner end of said shaft, which extends substantially at right angles to the axis of rotation of flywheel 5, is rotatably supported in a boss 53 provided in wall 13, by means of a roller bearing 54. The inner end of shaft 50 has rigidly connected thereto a bevel gear 55 which meshes with a bevel gear 56 shown as integral with stub shaft 30. Having thus described one known combination of starter elements, to which the preferred embodiment of the present invention is readily adaptable, there will now be described the elements constituting said preferred embodiment as herein illustrated.

Referring principally to Figs. 2 and 5, the invention is shown embodied in a plurality of wedging members in the form of rollers 66 disposed within a retaining ring 65, each of said rollers having a frusto-conical outline with the converging elements of the lateral surfaces thereof coinciding with the radii of a sphere, the center of which is located at the point of intersection between the axis of rotation of the unit and the plane at right angles thereto and vertically bisecting each of said rollers. As will be evident hereinafter, however, the wedging action does not depend upon the conical characteristic of the members 66 and said members may in fact be of other shapes, such as spherical, provided they are disposed in the manner illustrated, to wit, in co-operating recesses 67 and 68 formed at equal radial intervals about the opposing faces of the members 69 and 70 respectively, the latter being shown as a flange extended radially from the sleeve 38 at a point in parallel relation with a pressure plate 72 located at one end of the clutch assembly 37. The member 69 is likewise shown as a flanged portion of a sleeve or nut 74 having a relatively smooth outer surface of substantially the same diameter as the inner diameter of the sleeve 38, and having an inner surface coarsely threaded to correspond to the thread on the outer surface of the shaft 47. Thereby rotary movement of the nut 74 may produce limited longitudinal motion of the shaft 47 due to the provision of such cooperating threads. As shown, the flange 69 of the sleeve 74 is located intermediate the ends of said sleeve and is adapted to be engaged on the surface remote from the rollers 66 by another series of rollers 79 held in relation thereto by the provision of an annular plate 80 having its outer periphery splined to cooperate with the splines on the inner surface of the barrel 31 and adapted to be contacted by the ends of the coil springs 41, above described, the said rollers 79 thus acting as thrust bearings when relative rotation occurs between the said barrel 31 and the nut 74, in the manner which will presently appear.

In operation, the flywheel 5 is accelerated to the desired speed by either hand or power means applied to the shaft 50, and through the intermediary gears 55, 56, barrel 31 and gears 33, 28, 27, 26, 21 and 20, the concurrent rotation of the barrel 31 being communicated through the clutch plates 37 (these plates being held in frictional engagement by only a relatively light pressure during this stage of the operation) to the sleeve 38. Rotation of the sleeve 38 is in turn communicated to the nut 74 through the wedging rollers 66, which during this period of comparatively no load—the jaw clutch 6 being out of contact with the engine member 7—occupy the relative position, axially, indicated in Figs. 2 and 3. Since there is no axial pressure being applied this time to the shaft 47, and since there is no constraint on this member or on the jaw clutch 6, both these elements rotate idly as a unit with the nut 74. As soon, however, as the flywheel 5 has been accelerated to the desired speed and the rod 61 urged to the left to mesh the jaw 6 with the engine member 7 through the intermediate members 47 and 49, the resultant load and resistance to rotation placed upon the elements 6 and 47 causes a retardation of the nut 74 relatively to the sleeve 38, with the result that the rollers 66 are urged along the inclined surfaces of the recesses 67 and 68, thereby causing the flanges 69 and 70 to be spread apart and a resultant compression of the springs 41. As this compressing action continues, the torque transmitting capacity of the clutch plates 37 increases correspondingly until a condition is reached wherein the torque applied to the sleeve 38, and thence to the rollers 66, substantially balances the spring pressure applied to the clutch. This condition is reached when the rollers 66, in their climb along the slopes of their respective recesses, have moved through an angle whose tangent is the ratio which the pressure of springs 41 (expressed in pounds) bears to the driving torque, expressed in pounds, plus the co-efficient of friction of the rollers. When this occurs, relative rotation ceases, and there follows a comparatively positive drive from the barrel 31 to the jaw clutch 6, now in cranking relation to the engine member 7.

In the event of a decrease in the coefficient of friction of the surfaces of the clutch discs due to the heat generated therein, or due to any other cause, or in the event of any tendency of the discs to expand due to such heat absorption, the torque transmitting capacity nevertheless remains at the preset amount, since any such increase produces automatically a compensating shifting of the rollers 66, so as to establish a new angle which varies from the old by an amount corresponding to the angle whose tangent is equivalent to the difference between the old and the new co-efficients of friction. In this new position the new axial component of the driving torque will differ from the old by exactly the amount of change in the spring pressure, thereby maintaining equilibrium. The result of such equilibrium is to maintain the effective component of the driving torque constant regardless of how much the axial component thereof may change in order to balance the variations in the degree of spring compression.

As soon as the engine is started under its own power, the inclined surfaces of the engine clutch member 7 act to return the starter clutch member 6 to the position indicated in Fig. 1, the spring 49 acting at the same time to return shaft 47 to the position indicated. The resultant axial thrust of the member 47, coupled with the removal of the load, permits the springs 41 to return the rollers 66 and sleeve 38 to their initial positions, thus placing the parts in readiness to repeat the cycle of operation on the next energization of the starter.

There is thus disclosed a novel mechanism applicable to any known type of starter wherein the driving torque is transmitted to a member of the engine to be started through a clutch connection, the invention being so applicable without entailing any expensive addition to or alterations in such starters as now used. While the embodiment of the invention herein disclosed possesses considerable practical merit, it is understood that the invention is not limited to the form shown in the drawings, but is capable of a variety of mechanical embodiments. For example, in order to render the clutch control effective for either direction of rotation, the members 69 and 70 may be varied in form as indicated at 90 and 91, respectively, in Fig. 6. These changes consist in grooving the recesses 67 on either side of each roller 66, as shown at 90, also in providing corresponding tongues 93 on the member 70, these tongues extending from depressions 91 in the otherwise straight bevelled edge 92 of the said member 70. As shown, the tongues are spaced so as to be symmetrical with the associated grooves 90. With this construction it is apparent that the rollers 66 will be at all times constrained for movement in unison with the member 70, while relative load responsive movement between the rollers and the members 69 will be possible in either a clockwise or counter-clockwise direction, depending upon the direction of rotation of the starter.

Various other changes, which will now suggest themselves to those skilled in the art, may be made in the form, details of construction and arrangement of the parts without departing from the spirit of the invention, or the scope of the broadest of the appended claims.

What is claimed is:

1. In combination, in a clutch operating device, a pair of laterally movable plates whose relative lateral movement controls the operation of the clutch, a plurality of rolling members interposed between said plates to produce such relative lateral movement, means integral with said plates for holding each of said rolling members isolated from the others, and means including a rod movable along the axis of the clutch to increase the load thereon and thereby render said rollers effective to produce said relative lateral movement.

2. In combination, in a clutch operative device, a pair of laterally movable plates whose relative lateral movement controls the operation of the clutch, a plurality of rolling members interposed between said plates to produce such relative lateral movement, means integral with said plates for holding each of said rolling members isolated from the others, said integral means comprising lateral projections on said plates, said projections cooperating to form separate pockets for each of said rolling members, and means including a rod movable along the axis of the clutch to increase the load thereon and thereby render said rollers effective to produce said relative lateral movement.

3. In combination, in a clutch operating device, a pair of laterally movable plates, a third plate fixed against movement laterally, said plate controlling the operation of the clutch, means including a rod movable along the axis of the clutch to increase the load thereon and thereby cause one of said plates to move toward said fixed plate as the load is applied, and resilient means interposed between said fixed and movable plate for yieldably opposing such movement and thereby causing pressure to be applied to the clutch.

4. In combination, in a clutch operating device, a pair of laterally movable plates, a third plate fixed against movement laterally, said plate controlling the operation of the clutch, means including a rod movable along the axis of the clutch to increase the load thereon and thereby cause one of said plates to move toward said fixed plate as the load is applied, and resilient means interposed between said fixed and movable plate for yieldably opposing such movement, said resilient means also being yieldable to compensate for variation in the torque capacity of the clutch due to thermal expansion therein.

FRANCIS LINDER.